(12) United States Patent
Parker et al.

(10) Patent No.: US 6,437,070 B1
(45) Date of Patent: Aug. 20, 2002

(54) ACRYLIC POLYMER COMPOSITIONS WITH CRYSTALLINE SIDE CHAINS AND PROCESSES FOR THEIR PREPARATION

(75) Inventors: Hsing-Yeh Parker, Woodinville, WA (US); Richard Foster Merritt, Fort Washington, PA (US); Zhenwen Fu, Lansdale, PA (US); Scott Alan Ibbitson, Trappe, PA (US); Robert Howard Gore, Southampton, PA (US); Martha Alice Harbaugh Wolfersberger, Perkasie, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/388,882

(22) Filed: Sep. 2, 1999

Related U.S. Application Data

(60) Provisional application No. 60/101,415, filed on Sep. 22, 1998.

(51) Int. Cl.[7] .............................................. C08F 220/10
(52) U.S. Cl. .................... 526/325; 526/318.4; 526/320; 526/332; 526/347
(58) Field of Search .............................. 526/318.4, 320, 526/325, 323.1, 332, 347

(56) References Cited

U.S. PATENT DOCUMENTS

| | | |
|---|---|---|
| 3,657,175 A | 4/1972 | Zimmerman |
| 3,891,591 A | 6/1975 | Chang et al. |
| 5,114,820 A | 5/1992 | Georges et al. |
| 5,387,450 A | 2/1995 | Stewart |
| 5,412,035 A | 5/1995 | Schmitt et al. |
| 5,469,867 A | 11/1995 | Schmitt |
| 5,665,822 A | 9/1997 | Bitler et al. |

FOREIGN PATENT DOCUMENTS

| | | |
|---|---|---|
| EP | 0 003 235 | 8/1979 |
| EP | 0 013 836 | 8/1980 |
| EP | 0 570 093 | 11/1993 |
| EP | 0 768 385 | 4/1997 |
| JP | 62-240584 A | 4/1986 |
| JP | 05-171101 A | 12/1991 |
| JP | 07-145289 A | 6/1995 |
| JP | 09-255727 A | 9/1997 |
| JP | 09-292675 A | 11/1997 |
| WO | WO 95/02003 | 1/1995 |
| WO | WO 96/26249 | 1/1996 |
| WO | WO 98/25710 | 12/1997 |

*Primary Examiner*—Helen L. Pezzuto

(57) ABSTRACT

Acrylic polymer compositions with crystalline side chains are disclosed. Solution polymerization, aqueous suspension polymerization, and aqueous dispersion polymerization processes for the preparation of the acrylic polymer compositions with crystalline side chains are also disclosed. Methods of use for the acrylic polymer compositions with crystalline side chains, including dry powder coatings; wax replacements in floor polishes and wood coatings; nonwoven and textile coatings; adhesives; and hot melt adhesives are also disclosed.

6 Claims, No Drawings

ACRYLIC POLYMER COMPOSITIONS WITH CRYSTALLINE SIDE CHAINS AND PROCESSES FOR THEIR PREPARATION

This application claims the benefit of U.S. Provisional Application No. 60/101,415, filed Sep. 22, 1998.

Acrylic polymers have many useful properties such as durability, flexibility in composition and glass transition temperature ("Tg"), weather resistance, adhesion to polar substrates, and compatibility with many polar polymers and inoganic components. While each of the properties may be desirable, it is difficult to obtain all of them in one polymer. One often needs to sacrifice one property to gain another because the properties of the polymer depend on the polymer's composition, molecular weight, and Tg. For example, a low Tg may be desirable for a polymer composition which would be useful in adhesive applications, but the low Tg polymer may not provide good durability.

In addition, because acrylic polymers are generally amorphous, they are not effective in all applications where crystallinity is desired. They do not adhere well to most non-polar substrates such as polyolefins. Amorphous acrylic polymers also are inferior in terms of water resistance and durability as compared with polyolefins. Therefore, there is a need for low cost polymer compositions which provide durability, flexibility in composition and Tg, weather resistance, adhesion to polar and non-polar substrates, compatibility with polar polymers and inoganic components, and water resistance.

Previous methods to achieve a combination of desired properties of acrylic polymers and olefin polymers in "one" polymer included physically mixing an acrylic polymer and an olefin polymer or copolymerizing an olefin monomer and an acrylic monomer. These methods have not been successful. Physical mixing of acrylic polymers and polyolefins does not usually yield useful compositions because the two polymers are incompatibile. Copolymerizing an olefin monomer and an acrylic monomer is difficult because there is poor reactivity between the two monomers. In addition, copolymerization of two monomers usually results in a composition with an average of the combined properties of each homopolymer rather than enhanced properties.

U.S. Pat. No. 5,387,450 ('450) tries to solve the problem. This patent discloses polymer compositions which contain as polymerized units crystallizable side chain monomers and are useful as adhesives. Below the melting temperature of the crystallizable side chain, the polymer is non-tacky. Above the melting temperature of the crystallizable side chain, the polymer turns into a tacky adhesive. The compositions are required to contain at least 50 weight percent of a crystallizable side chain monomer. The crystallizable side chain monomers are acrylates ormethacrylates with 14 to 22 carbon atoms as side chains. Even though this patent provides a route to achieve some of the properties discussed above, there are still several problems unresolved by the patent. The crystallizable side chain monomers of the patent have lower melting points and are more soluble in organic solvents than crystallizable side chain monomers with more carbon atoms in the side chains. Therefore, one problem is that the patent does not address how to process crystallizable side chain monomers with more carbon atoms in the side chains, which require higher temperatures to melt and are less soluble in organic solvents. Another problem is that crystallizable side chain monomers are relatively new and due to their special structure are estimated to cost several times more than the other monomeric components. For these reasons, it is desirable to minimize the amount of crystallizable side chain monomer in one polymer and still achieve the properties described above. Despite the disclosure of '450, there is still a need for low cost polymer compositions which provide durability, flexibility in composition and Tg, weather resistance, adhesion to polar and non-polar substrates, compatibility with polar polymers and inoganic components, and water resistance.

To provide the desired polymer compositions, the inventors have prepared polymers containing an acrylic backbone with less than 50 percent by weight synthetic wax monomer ("SWM"). The SWM contains crystalline polyethylene side chains and therefore is a crystalizable side chain monomer. One benefit from the copolymers of this invention is that one may achieve physical crosslinking through the association of one polymer component. This association can be crystallization or simply phase separation. The physical crosslinks that form are not permanent and can be "decrosslinked" by heating. Through such physical crosslinking, the backbone polymer matrix forms a network like structure, yet it can be fully decrosslinked when the polymer is heated above the melting temperature of the association blocks. Formation of a network structure helps to prevent loss of the physical properties when one has to reduce the molecular weight or Tg of the backbone polymer for processing or flexibility reasons.

In a first aspect, the present invention provides a polymer including as polymerized units:

A) from 1 to less than 50 percent by weight of a synthetic wax monomer of formula I:

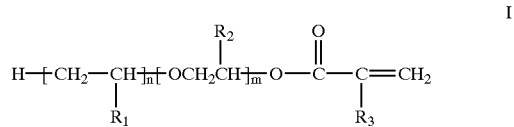

wherein
$R_1$ is selected from H and $CH_3$,
$R_2$ is selected from H and $C_1$–$C_5$ alkyl,
$R_3$ is selected from H and $CH_3$,
n=9–115, preferably 12–90, more preferably 15–50, and
m=0–1370, preferably 0–65, more preferably 0–50; and B) from 50 to 99 percent by weight of at least one second monomer.

Previously, it has been difficult to prepare the polymer compositions described above. For example, the '450 patent described above utilized a one shot solution polymerization reaction to polymerize the monomers. For a solution process, it is desirable to be able to gradually add the SWM to the polymerization kettle because it is believed that the SWM will be more evenly incorporated into the polymer. Emulsion and suspension processes are desirable because they allow for a reduction of or elimination of organic solvents. The '450 patent did not address these concerns. Consequently, there is a continuing need for processes to prepare polymers containing SWMs.

The inventors have provided several approaches to preparing polymers containing SWMs. In one approach, a SWM slurry is prepared prior to polymerization of the SWM. The slurry may be used to prepare solution or suspension polymers. For a solution process, the slurry may be combined with additional monomers or organic solvent and co-fed to a reactor with an initiator. For a suspension process, the slurry is combined with an initiator and an aqueous solution and polymerized.

In a second aspect, the present invention provides a method of preparing a polymer from a slurry by: 1) forming a slurry by cooling a solution containing a synthetic wax monomer and a solvent; 2) forming a reaction mixture by admixing at least one second monomer with the slurry; and 3) polymerizing the reaction mixture in the presence of an initiator.

In a third aspect, the present invention provides a method of preparing a polymer from an emulsion by dissolving a synthetic wax monomer in at least one second monomer to form a solution, admixing water and at least one surfactant to provide a second solution, forming a monomer emulsion by admixing the first and second solutions, providing a reactor with heated water, and polymerizing the monomer emulsion by adding the monomer emulsion and at least one initiator to the reactor.

In a fourth aspect, the present invention provides a method of coating including applying a composition containing the polymer of the invention to a substrate.

As used throughout this specification, by the term (meth) acrylic acid is meant both acrylic acid and methacrylic acid. Likewise, as used throughout this specification, by the term (meth)acrylate is meant both acrylate and methacrylate esters.

The SWMs of this invention are $C_{24}$ to $C_{80}$, preferably $C_{30}$ to $C_{50}$ ethylenically unsaturated (meth)acrylate monomers or ethoxylates thereof and are formed from $C_{24}$ to $C_{80}$ synthetic wax alcohols. Generally, the SWMs are formed by reacting a $C_{24}$ to $C_{80}$ synthetic wax alcohol or ethoxylate thereof with an alkyl (meth)acrylate in the presence of a zirconium catalyst and suitable inhibitor, although they may be made by other processes well known in the art. Suitable alcohols or ethoxylates are available from Baker Petrolite, Inc. Houston, Tex. as Unilin™ or Unithox™ products. Suitable examples of SWMs include the acrylate or methacrylate esters of Unilin 350, Unilin 450, Unilin 550, Unilin 700, and Unithox 450. The amount of SWM in the polymer is typically from 1% to less than 50%, preferably 3% to 45%, more preferably 4% to 40%, most preferably 5% to 35% by weight, based on the total weight of the polymer of this invention.

The at least one second monomer may be an ethylenically unsaturated monomer. Suitable ethylenically unsaturated monomers include acrylic and methacrylic acid and esters thereof. Generally, the (meth)acrylates are $C_1$ to $C_{24}$ (meth) acrylates. The (meth)acrylate is typically from 50% to 99%, preferably 55% to 97%, more preferably 60% to 96% by weight, based on the total weight of the polymer of the composition of this invention. Examples of the alkyl (meth) acrylate are methyl methacrylate (MMA), ethyl methacrylate (EMA), methyl and ethyl acrylate, propyl methacrylate, butyl methacrylate (BMA) and acrylate (BA), isobutyl methacrylate (IBMA), hexyl and cyclohexyl methacrylate, cyclohexyl acrylate, 2-ethylhexyl acrylate (EHA), 2-ethylhexyl meth-acrylate, octyl methacrylate, decyl methacrylate, isodecyl methacrylate (IDMA, based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate, dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates, hexadecyl methacrylate, heptadecyl methacrylate, octadecyl methacrylate, nonadecyl methacrylate, cosyl methacrylate, eicosyl methacrylate, cetyl-eicosyl methacrylate (CEMA), a mixture of hexadecyl, octadecyl, cosyl and eicosyl methacrylate; and cetyl-stearyl methacrylate (SMA), and a mixture of hexadecyl and octadecyl methacrylate. Mixtures of one or more (meth)acrylates may also be used.

Another class of suitable ethylenically unsaturated monomers useful as the at least one second monomer are vinylaromatic monomers which include, among others, styrene (Sty), α-methylstyrene, vinyltoluene, p-methylstyrene, ethylvinylbenzene, vinylnaphthalene, vinylxylenes, and the like. The vinylaromatic monomers can also include their corresponding substituted counterparts, such as halogenated derivatives, i.e., containing one or more halogen groups, such as fluorine, chlorine or bromine; and nitro, cyano, alkoxy, haloalkyl, carbalkoxy, carboxy, amino, alkylamino derivatives and the like. The vinylaromatic monomers may be used at levels of from 0% to 50%, preferably 0% to 30% by weight, based on the total weight of the polymer of the composition of this invention.

Another class of suitable ethylenically unsaturated monomers that may be useful as the at least one second monomer are nitrogen-containing ring compounds and their thioanalogs, such as vinylpyridines such as 2-vinylpyridine or 4-vinylpyridine, and lower alkyl ($C_1$–$C_8$) substituted C-vinyl pyridines such as: 2-methyl-5-vinyl-pyridine, 2-ethyl-5-vinylpyridine, 3-methyl-5-vinylpyridine, 2,3-dimethyl-5-vinyl-pyridine, 2-methyl-3-ethyl-5-vinylpyridine; methyl-substituted quinolines and isoquinolines, N-vinylcaprolactam, N-vinylbutyrolactam, N-vinylpyrrolidone, vinyl imidazole, N-vinyl carbazole, N-vinyl-succinimide, acrylonitrile, o-, m-, or p-aminostyrene, maleimide, N-vinyl-oxazolidone, N,N-dimethyl aminoethyl-vinyl-ether, ethyl-2-cyano acrylate, vinyl acetonitrile N-vinylphthalimide. Also included are N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone, 3,4,5-trimethyl-1-vinyl-pyrrolidone, and other lower alkyl substituted N-vinyl-pyrrolidones. The nitrogen-containing ring compounds and their thioanalogs may be used at levels of from 0% to 50%, preferably 0% to 30% by weight, based on the total weight of the polymer of the composition of this invention.

Another class of suitable ethylenically unsaturated monomers that may be useful as the at least one second monomer are substituted ethylene monomers, such as vinyl acetate, vinyl chloride, vinyl fluoride, vinyl bromide, vinylidene chloride, vinylidene fluoride, vinylidene bromide, acrylonitrile, methacrylonitrile, acrylic acid (AA) and corresponding amides and esters, methacrylic acid (MAA) and corresponding amides and esters. The substituted ethylene monomers may be used at levels of from 0% to 50%, preferably 0% to 30% by weight, based on the total weight of the polymer of the composition of this invention.

Another class of acrylic and methacrylic acid derivatives that may be useful as the at least one second monomer is represented by substituted alkyl acrylate and methacrylate and substituted acrylamide and methacrylamide monomers. Examples include (meth)acrylates wherein the alkyl group is substituted with halogen, such as fluorine, chlorine or bromine; and nitro, cyano, alkoxy, haloalkyl, carbalkoxy, carboxy, amino, alkylamino derivatives, glycidyl (meth) acrylate and the like. The substituted alkyl acrylate and methacrylate and substituted acrylamide and methacrylamide monomers may be used at levels of from 0% to 50%, preferably 0% to 30% by weight, based on the total weight of the polymer of the composition of this invention.

Each of the substituted monomers that may be useful as the at least one second monomer can be a single monomer or a mixture having different numbers of carbon atoms in the alkyl portion. The alkyl portion of each monomer can be linear or branched.

Hydroxyalkyl (meth)acrylate monomers may also be useful in this invention as the at least one second monomer. Among the hydroxyalkyl methacrylate and acrylate monomers suitable for use in the present invention are 2-hydroxyethyl methacrylate (HEMA), 2-hydroxyethyl acrylate(HEA), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. The hydroxyalkyl (meth)acrylate monomers may be used at levels of from 0% to 50%, preferably 0% to 30% by weight, based on the total weight of the polymer of the composition of this invention.

Additional examples of substituted (meth)acrylate monomers useful as the at least one second monomer are those alkyl methacrylate and acrylate monomers with a dialkylamino group in the alkyl radical, such as dimethylaminoethyl methacrylate, dimethylaminoethyl acrylate and the like.

Other examples of substituted (meth)acrylate monomers useful as the at least one second monomer are nitrogen-containing ring compounds (previously described) and dialkylaminoalkyl methacrylamide and acrylamide monomers, such as N,N-dimethylaminoethyl methacrylamide, N,N-dimethyl-aminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and the like.

Ethylenically unsaturated acid monomers such as, for example acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride may also be used as the at least one second monomer in the polymers of this invention. The ethylenically unsaturated acid monomers may be used at from 0%–20% by weight, based on the weight of the polymer.

The polymer of this invention can be linear, branched or partially crosslinked. It can be post crosslinkable. By post crosslinkable is meant that the polymer may have reactive groups which do not react during polymerization, but may react after polymerization to provide crosslinking. The physical form of the polymer may be pellets, beads, emulsion, solution, or chunks. The polymer may have a molecular weight of from 5,000 to 5,000,000, preferably 10,000 to 2,000,000, more preferably 20,000 to 1,000,000 as determined by gel permeation chromatography ("GPC"). The polymer may have a melting point of from 20° C. to 110° C. as determined by differential scanning calorimetry ("DSC"). Alternate processes may be used to prepare the polymer of this invention. Suitable processes include solution polymerization, aqueous suspension polymerization, and aqueous dispersion polymerization (both batch and semi-continuous).

In the slurry process of the invention, a slurry is formed by cooling a solution containing the SWM and a solvent until the SWM precipitates out of solution as crystals. This process may be used for solution or suspension polymerization. For a solution process embodiment, the SWM may be admixed with an organic solvent and heated until the SWM is melted and dissolved, and then cooled with agitation. Suitable solvents include, but are not limited to hexane, heptane, xylene, toluene, ethyl acetate, butyl acetate, hexanol, heptanol, octanol, decane, decalin, and the like. After cooling, other monomers may be added. Suitable monomers include (meth)acrylic acid, esters of (meth)acrylic acid, (meth)acrylic amides, vinyl aromatic monomers, substituted ethylene monomers, functional monomers with a post crosslinkable group, multifunctional monomers, and mixtures thereof. The cooled slurry can be gradually added to a reaction kettle in the presence of an initiator to form solution polymers.

For a suspension process embodiment, the SWM may be admixed with other monomers and an aqueous solution and heated until the SWM is melted and dissolved in the organic phase. The mixture is cooled below the temperature at which polymerization will be initiated and then initiator is added. The mixture is stirred to evenly incorporate the initator into the organic phase. The cooled mixture containing the initiator is then heated and the stirring rate is increased to form a dispersion and to initiate polymerization. The aqueous solution may contain a suspending agent/dispersant for stabilizing polymerizing droplets. The suspending agent/dispersant may be used at from 0.01% to 5% by weight, based on the total weight of the mixture. Suitable suspending agents/dispersants include polyalkyldimethylammonium chloride, polyvinylalcohol, hydroxyethylcellulose, hydroxypropylcellulose or various other cellulose materials, polyvinyl pyrrolidone, natural gum, powdered dispersants, and the sodium salt of poly(meth)acrylic acid homopolymer or copolymers.

In the dispersion process of the invention, a solution containing a SWM in at least one second monomer is provided. In the process, the solution may be obtained by heating an admixture of a SWM in at least one second monomer until the synthetic wax monomer melts and dissolves as described above. The solution may be admixed with a second aqueous surfactant solution to create a monomer emulsion.

In one embodiment of the dispersion process, the at least one second monomer of the first solution may be selected from the monomers described above, including (meth)acrylic acid, esters of (meth)acrylic acid, (meth)acrylic amides, vinyl aromatic monomers, substituted ethylene monomers, functional monomers with a post crosslinkable group, multifunctional monomers, and mixtures thereof.

In a second embodiment of the dispersion process, the at least one second monomer of the first solution may be selected from a SWM containing polyethylene blocks. In this case, the second SWM acts as an aqueous dispersant for the first SWM. SWMs such as poly(ethylene-b-ethyleneoxide)-acrylate (Unitho™ to 450 acrylate), may be suitable for these purposes. Similar low molecular weight diblock polymers without the polymerizable (meth)acrylate end group, such as poly(ethylene)-b-poly(ethyleneoxide)-OH (Unithox™ ethoxylate), may also be used as dispersants. The dispersants may be used at from 0% to 20% by weight, preferably 1% to 15% by weight, more preferably 2% to 10% based on the total weight of the first synthetic wax monomer.

For both dispersion process embodiments, the second solution may be an aqueous surfactant solution. Surfactants may be used at from 0.1% to 5% by weight, based on the total weight of the monomer mixture. The surfactants can be anionic, nonionic or cationic. Anionic surfactants or a combination of an anionic surfactant with a nonionic surfactant are preferred.

In the processes of the invention, a reaction mixture is formed by admixing at least one second monomer with the SWM. The amount of the at least one second monomer admixed with the SWM ranges from 50% to 99%, preferably 60% to 97%, more preferably 65% to 95% by weight based on the weight of the SWM. The at least one second monomer to be admixed with the synthetic wax monomer may be selected from the monomers described above, including (meth)acrylic acid, esters of (meth)acrylic acid, (meth) acrylic amides, vinyl aromatic monomers, substituted ethylene monomers, functional monomers with a post crosslinkable group, multifunctional monomers, and mixtures thereof.

In the processes of the invention, the monomers may be polymerized by co-feeding the reaction mixture and an initiator to a reactor or batch polymerizing a reaction mixture in a reactor at a temperature sufficient to initiate polymerization. Typically, the reactor is at a temperature from 75° C. to 110° C. The initiator is preferably water insoluble and may be selected from peroxyesters, dialkylperoxides, alkylhydroperoxides, persulfates, azoinitiators, redox initiators and other known free radical initiators. Part of the initiator is incorporated into the polymer as end groups. The amount of the initiator used is generally from 0.05% to 5% by weight, based on the weight of total monomer.

The dispersion process will yield a latex polymer. The polymer from the latex can be isolated by any method known in the art, such as spray drying, freeze drying, or coagulation. The suspension process will yield polymer beads. The polymer beads can be isolated by filtration. The solution process will yield a homogeneous polymer solution when a good solvent is used. Toluene, xylene, and decalin are examples of good solvents. If one wants to isolate the polymer from solution, one would use a poor solvent. By poor solvent is meant that the polymer is soluble in the solvent at high temperature, but insoluble at low temperature. Examples of poor solvents are heptane, hexane, or other saturated alkane solvents. The polymer may be isolated by cooling of the solution followed by filtration. Where a solid is isolated, the solid may contain solvent and may be vacuum dried at ambient temperature to give neat polymer chunks. The crumbly solid may also be diluted in solvent, re-heated to form a solution, cooled with stirring, vacuum filtered, and air dried on a Buchner funnel to yield solid polymer chunks.

Chain transfer agents may be used for regulating molecular weight in the processes to prepare the polymers of this invention. Suitable chain transfer agents include organic thiol compounds such as n-dodecyl mercaptan and the like. The chain transfer agent may be used at 0% to 10% by weight of the total monomer mixture. When used in the processes to prepare the polymers of this invention, part of the chain transfer agent structure is incorporated into the polymer as an end group.

A salt may be used in suspension processes of preparing the polymers of this invention to reduce the solubility of organic monomers in the aqueous phase. The salt may be used at from 0% to 8% by weight, based on the total weight of the mixture. Suitable salts include sodium chloride, potassium chloride and the like.

Organic solvents may be used in suspension processes of preparing the polymers of this invention for improving the solubility of the synthetic wax (meth)acrylate in the other monomers. The organic solvents may be used at from 0% to 200% by weight, preferably 0% to 100% by weight, based on the total weight of the synthetic wax (meth)acrylate.

A buffer may be useful in dispersion processes to prepare the polymers of this invention to maintain the pH of the aqueous phase. Suitable buffers include sodium, potassium, and ammonium salts of carbonate, bicarbonate, acetate, phosphate, and borate. The buffers may be used at from 0% to 5% based on the total weight of the composition.

Sodium nitrite or sodium perborate may be useful as radical inhibitors in dispersion processes to prepare the polymers of this invention to inhibit any undesirable polymerization in the aqueous phase. The radical inhibitors may be used at from 0% to 1% based on the total weight of water in the composition.

The polymers prepared by the process of the invention are useful in applications such as hot melt adhesives, hot melt sealants/caulks, plastic additives, compatibilizers, textile binders, roof mastics, traffic paints, barrier or protective coatings, powder coatings, water resistant sealer for wood and masonry materials, floor wax, water repellants for textiles, carrier polymers of biocides or other active ingredients in agriculture products.

For use in the above coating applications, the polymer may be formulated with materials such as binders, pigments, additives and fillers to prepare coating compositions suitable for each application. The coating composition is then applied to a substrate and then dried. The coating composition may be applied by spraying, dipping, or other methods known in the art. Suitable substrates include vinyl, polypropylene, metal, wood, cement, paper, nonwovens, textiles, and other substrates known in the art. The coating composition may be dried under ambient conditions. Forced air may be utilized to aid in the drying of the coating composition. Heat may also be utilized in the drying of the coating composition. The forced air may be heated, or the coated substrate may be placed in a heated oven. The temperature of the heat may range from 35° C. to 110° C.

The polymers of this invention may also be useful as dry powder coating compositions. For dry powder coating compositions, the polymer is isolated as a solid by the techniques described above. The dry polymer may be ground to a powder by any milling equipment suitable for producing particles in the size range of 0.1 to 50 microns, more preferably 0.25 microns to 35 microns, and most preferably from 0.5 microns to 25 microns. The particle size may be measured on a Coulter™ LS, light scattering, particle size analyzer. Suitable mills are attrition mills, fluid-energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, 100 to 1000 microns and a second mill reduces the particle size further to the desired range. An example would be the initial use of a hammer mill followed by a semiautogenous mill like a Dyno-Mill™ from CB Mills Inc (Buffalo Grove, Ill.).

The dry powder may be applied to a substrate, heated to form a film, and cooled. Suitable substrates include vinyl, polypropylene, metal, wood, cement, paper, nonwovens, textiles, and other substrates known in the art. The dry polymer powder may be heated at temperatures ranging from 60° C. to 150° C. to form a film. The film may then be cooled either by storage at ambient temperature or by the use of cooled forced air.

The polymer may also be useful as an adhesive. For adhesive applications, a first polymer coated substrate is formed by applying the polymer to a substrate such as vinyl, polypropylene, metal, wood, cement, or paper. The polymer may be in the form of a liquid or a solid. For a solid polymer, the polymer is then heated to the melting point of the polymer. A second substrate may then be applied to the first polymer coated substrate. The second substrate may be selected from vinyl, polypropylene, metal, wood, cement, paper, or release paper. The polymer is then dried or cooled. The polymer may be dried under ambient conditions. Forced air may be utilized to aid in the drying of the coating composition. Heat may also be utilized in the drying of the coating composition. The forced air may be heated, or the coated substrate may be placed in a heated oven. The temperature of the heat may range from 35° C. to 110° C. The polymer may be cooled either by storage at ambient temperature or by the use of cooled forced air.

The following examples are intended to demonstrate the polymer of the invention, the process of the invention, alternate processes to prepare the polymer of the invention, and the usefulness of the polymer of the invention in various applications. The following abbreviations apply throughout the examples:

SWM 1=Unilin™ 550MA ($C_{40}$ (average) methacrylate)
SWM 2=Unilin™ 550A ($C_{40}$ (average) acrylate)
SWM 3=Unilin™ 700MA ($C_{50}$ (average) methacrylate)
SWM 4=Unilin™ 700A ($C_{50}$ (average) acrylate)
SWM 5=Unilin™ 350A ($C_{25}$ (average) acrylate)
SWM 6=Unilin™ 350MA ($C_{25}$ (average) methacrylate)
SWM 7=Unilin™ 425A ($C_{35}$ (average) acrylate)
SWM 8=Behenyl Acrylate
SWM 9=Unithox™ 450A ($C_{30}$ (average)-b-$(CH_2CH_2O)_{10.5}$ (average) acrylate)
SWM 10=Unithox™ 450MA ($C_{30}$ (average)-b-$(CH_2CH_2O)_{10.5}$ (average) methacrylate)
DISP 1=Unilin™ 450 ethoxylate
DISP 2=Unilin™ 550 ethoxylate
IBOMA =isobornyl methacrylate Preparation of Polymer Using Process 1 (Solution/Slurry).

A mixture of 75.0 grams of SWM 4 and 131.3 grams of heptane was heated to form a solution. The solution was stirred magnetically and allowed to cool. During cooling, SWM crystals precipitated from the solution. When the temperature had dropped to 500° C.–600° C. there was added 150.0 grams of butyl acrylate. The solution temperature dropped to 40° C. One hundred fifty grams of methyl methacrylate was then added to the solution. The temperature of the solution dropped to 30° C. The mixture was allowed to cool to room temperature to give an easily stirrable slurry. An initiator solution was prepared using 6.3 grams of Lupersol 575 (t-amylperoxy 2-ethylhexanoate) and 26.6 grams of heptane.

A 25.3 gram portion of the monomer slurry and 39.2 grams heptane were weighed into a 1-liter 4-necked flask fitted with a C-stirrer, thermocouple, $N_2$ inlet, and separate feed lines for monomer slurry and initiator solution. This mixture was stirred with a $N_2$ blanket and heated until a gentle reflux began at approximately 85° C. A 2.1 gram portion of the initiator solution was then added. A clear, pale yellow solution resulted. After a ten minute hold, simultaneous feeds of monomer slurry and initiator solution were begun and enough heat was applied to maintain gentle reflux of the solution. After three hours a total of 269.1 grams of the monomer slurry had been fed and the temperature had reached 102° C. Both feeds were stopped for 15 minutes, then the remainder of the initiator solution was fed over 25 minutes. Following a 15 minute hold, the mixture was allowed to cool to room temperature. The polymer crystallized to give a crumbly solid which was 65% polymer, 35% heptane. A portion of this solid was vacuum dried at ambient temperature to give neat polymer chunks. Alternatively, a portion of the 65% solid material was diluted to approximately 30% solids with additional heptane, reheated to form a clear solution, then cooled to 7° C. with stirring, vacuum filtered and air dried on a Buchner funnel to give solid polymer chunks similar to those obtained by vacuum drying the 65% solid material.

Preparation of Polymer by Process 2 (Suspension Polymerization)

To 0.75 gram $NaH_2PO_4.2H_2O$ in a 500 ml 4-neck flask was added 100.0 grams deionized water and 3.75 grams of a 22.5% aqueous solution of dispersant EM-2B (methacrylic acid copolymer sodium salt) to give a clear solution pH 6.7. To the clear solution was then added 32.0 grams of butyl methacrylate and 10.0 grams of SWM 1. This mixture was stirred slowly with a $N_2$ sweep and heated to gentle reflux until the SWM 1 melted and dissolved to make a nearly clear solution, then cooled to 56° C. A solution of 0.53 grams of 95% Lupersol 575 in 8.0 grams of butyl methacrylate was then added. The stirring rate was increased and the mixture reheated to 95° C. over 10 minutes. The solution was stirred at that temperature for 2 hours, then allowed to cool. The polymer beads were collected by filtration, rinsed with deionized water, and allowed to dry at room temperature.

Characterization of the beads: The percent solids (30 minutes@ 150° C.) was 99.1 (average). The actual yield of polymer solids was 48.9 grams or 97.7% of theory. The residual acrylic monomer was 2969 ppm BMA as determined by Gas Chromatography ("GC"). The portion of the polymer solids soluble in tetrahydrofuran at room temperature was 78%. The beads flowed together to form a film when heated at 150° C. DSC of the polymer showed a Glass Transition Temperature ("Tg") of 28° C. and a single melt temperature of 67° C. The latter was an indication that the SWM was evenly incorporated into the acrylic polymer.

Preparation of Polymer by Process 3 (Solution)

A 1 liter reaction vessel was fitted with a thermocouple, a temperature controller, a purge gas inlet, a water-cooled reflux condenser with purge gas outlet, a stirrer, an Insta-Therm jacketed addition funnel, and a non-jacketed addition funnel. To the non-jacketed addition funnel was fed Monomer Mix 'A' which contained 316.34 grams of a homogeneous mixture of 122.50 grams butyl acrylate (100% purity), 192.76 grams methyl methacrylate (99.85% purity), 0.70 grams Lupersol 575, and 0.35 grams dodecyl mercaptan. To the jacketed addition funnel which was heated to and maintained at 90° C. to 100° C. was fed Monomer Mix 'B' which contained 56.88 grams of a homogeneous mixture of 43.76 grams SWM 4 (80.0% purity), and 17.50 grams toluene.

Ten percent (31.63 grams) of Monomer Mix 'A', 10 percent (6.13 grams) of Monomer Mix 'B', and 87.50 grams toluene were fed to the reaction vessel which was then flushed with nitrogen for 30 minutes before applying heat to bring the contents of the reaction vessel to 95° C. When the contents of the vessel reached 95° C., the balance of both Monomer Mix 'A' and 'B' were uniformly fed to the reaction vessel over 60 minutes. At the end of the monomer mixture addition, the reaction vessel contents were maintained at 95°

C. for 30 minutes. At the end of the 30 minute hold, the polymerization temperature was increased to 100° C. before starting a feed which contained 1.40 grams of Lupersol 575 and 35.00 grams toluene. The feed was added uniformly over a 60 minute period. At the end of the feed the batch was held at 100° C. for 60 minutes. At the end of the 60 minute hold, vacuum was applied and toluene was removed from the batch. The batch was eventually subjected to a vacuum of 25 mm Hg at 120° C. for 1 hour. The product so formed exhibited a polymer solids content of 97.8 weight % (by GPC), and a molecular weight (Mw) of 341,000.

Preparation of Polymer by Process 4 (Batch Dispersion Polymerization)

SWM 2 (25 grams) was dissolved in 75 grams styrene at 80° C. to 85° C. After the solution became uniform, 150 grams butyl acrylate, preheated to 80° C., was added to the solution. The mixture was agitated to keep it uniform. In a separate container, 200 grams deionized water and 2.5 grams of a 60% surfactant aqueous solution of Rhodapex CO436 were heated to 90° C. The monomer solution was added to the water/surfactant solution and homogenized at 15,000 rpm for several 30 seconds on-off cycles until the monomer emulsion turned thick.

While preparing the above monomer emulsion, 800 grams of deionized water was heated to 80° C. in a 3-liter round bottom flask with a condenser, a thermocouple, a mechanical stirrer and a nitrogen gas inlet, to provide a positive pressure of nitrogen flow in the head space of the reactor. The hot monomer emulsion was poured into the reactor followed by addition of 0.7 gram t-butylperoctoate. The reaction mixture was kept at 80° C. for 4 hours while agitated. At the end of the reaction, the mixture was cooled to room temperature.

Preparation of Polymer by Process 5 (Semi-Continuous Dispersion Polymerization)

SWM 5 (60 grams) and polyethylene-b-polyethyleneoxide dispersing aid DISP 1 (6 grams) were mixed together and heated until melted. Under agitation a mixture consisting of 528 grams butyl acrylate, 12 grams methacrylic acid and 3 grams n-dodecyl mercaptan was then added to the SWM 5 and DISP 1 mixture. The solution was heated at 85° C. and stirred until uniform. In a separate container, 600 grams deionized water and 21.4 grams of a 28% surfactant (sodium lauryl sulfate) aqueous solution were heated to 90° C. The hot monomer solution and the hot water surfactant solution were mixed and homogenized at 15,000 rpm for several 30 seconds on-off cycles until the monomer emulsion turned thick. After the monomer emulsion was cooled to below 40° C. under gentle stirring, 2 grams of t-butylperoctoate was added to the monomer emulsion and stirred for at least 10 minutes.

While preparing the above monomer emulsion, 200 grams deionized water was heated to 85° C. in a 3-liter round bottom flask with a condenser, a thermocouple, a mechanical stirrer and a nitrogen gas inlet, to provide a positive pressure of nitrogen flow in the head space of the reactor. Half of the monomer emulsion was added to the reactor. The mixture was allowed to react for 30 minutes. Then the second half of the monomer emulsion was gradually added into the reactor through a pump into the reactor in 2 hours. After the completion of the monomer emulsion feed, the reaction mixture was held at 85° C. for 1 hour and then cooled to room temperature.

The following were prepared by the processes described above:

| Sample | Composition | Process Made By |
| --- | --- | --- |
| 1 | 1 DISP 1/2 MAA/88 BA/ 10 SWM 5 | 5 |
| 2 | 1 DISP 1/2 MAA/88 EHA/ 10 SWM 5 | 5 |
| 3 | 1 DISP 2/29 IBOMA/ 2 MAA/ 59 BA/ 10 SWM 2 | 5 |
| 4 | 30 Sty/ 60BA/ 10 SWM 1 | 4 |
| 5 | 33 Sty/ 67 BA | 4 |
| 6 | 30 Sty/ 59 BA/ 1 MAA/ 10 SWM 1 | 4 |
| 7 | 15 Sty/ 73 BA/ 2 MAA/ 10 SWM 1 | 4 |
| 8 | 40 Sty/ 5 MMA/ 10 BA/ 5 MAA/ 40 SWM 2 | 4 |
| 9 | 25 Sty/ 30 MMA/ 20 BA/ 25 SWM 2 | 4 |
| 10 | 26 Sty/ 52 BA/ 2 MAA/ 20 SWM 2 | 4 |
| 11 | 20 Sty/ 58 BA/ 2 MAA/ 20 SWM 2 | 4 |
| 12 | 29 Sty/ 59 BA/ 2 MAA/ 10 SWM 9 | 4 |
| 13* | 88.9 BA/ 11.1 AA | 3 H |
| 14 | 80 BA/ 10 MAA/ 10 SWM 1 | 3 H |
| 15 | 80 BA/ 10 MMA/ 10 SWM 1 | 3 H |
| 16 | 78 BA/ 10 MMA/ 2 AA/ 10 SWM 1 | 3 H |
| 17 | 83 BA/ 10 MMA/ 2 AA/ 5 SWM 1 | 3 H |
| 18 | 83 BA/ 10 MMA/ 2 AA/ 5 SWM 3 | 3 H |
| 19 | 83 BA/ 10 MMA/ 2 AA/ 5 SWM 10 | 3 H |
| 20 | 83 BA/ 10 MMA/2 AA/ 5 SWM 6 | 3 H |
| 21* | 40 BA/ 60 MMA | 3 |
| 22* | 35 BA/ 65 MMA | 3 |
| 23* | 30 BA/ 70 MMA | 3 |
| 24* | 25 BA/ 75 MMA | 3 |
| 25 | 40 BA/ 55 MMA/ 5 SWM 4 | 3 |
| 26 | 35 BA/ 60 MMA/ 5 SWM 4 | 3 |
| 27 | 30 BA/ 65 MMA/ 5 SWM 4 | 3 |
| 28 | 50 BA/ 40 MMA/ 10 SWM 4 | 3 |
| 29 | 45 BA/ 45 MMA/ 10 SWM 4 | 3 |
| 30 | 40 BA/ 50 MMA/ 10 SWM 4 | 3 |
| 31 | 35 BA/ 55 MMA/ 10 SWM 4 | 3 |
| 32 | 30 BA/ 60 MMA/ 10 SWM 4 | 3 |
| 33 | 50 BA/ 3O MMA/ 20 SWM 4 | 3 |
| 34 | 45 BA/ 35 MMA/ 20 SWM 4 | 3 |
| 35 | 40 BA/ 40 MMA/ 20 SWM 4 | 3 |
| 36 | 35 BA/ 45 MMA/ 20 SWM 4 | 3 |
| 37 | 30 BA/ 50 MMA/ 20 SWM 4 | 3 |
| 38* | 40 BA/ 60 SWM 4 | 3 |
| 39* | 40 BA/ 60 SWM 2 | 3 |
| 40* | 40 BA/ 60 SWM 7 | 3 |
| 41* | 40 BA/ 60 SWM 5 | 3 |
| 42 | 60 BA/ 40 SWM 7 | 3 |
| 43 | 60 BA/ 40 SWM 5 | 3 |
| 44 | 80 BA/ 20 SWM 7 | 3 |
| 45 | 80 BA/ 20 SWM 5 | 3 |
| 46* | 45 BA/ 55 MMA | 3 |
| 47 | 47 BA/ 43 MMA/ 10 SWM 1 | 3 H |
| 48 | 10 Sty/ 33 MMA/ 47 BA/ 10 SWM 2 | 4 |
| 49* | 40 BA/ 60 SWM 8 | 3 |
| 50 | 60 BA/ 40 SWM 8 | 3 |
| 51 | 80 BA/ 20 SWM 8 | 3 |
| 52 | 90 BA/ 10 SWM 8 | 3 |
| 53 | 90 BA/ 10 SWM 5 | 3 |
| 54 | 90 BA/ 10 SWM 7 | 3 |
| 55 | 80 BMA/ 20 SWM 1 | 2 |
| 56 | 80 BMA/ 20 SWM/ 1 nDDM | 2 |
| 57 | 60 BMA/ 40 SWM 1 | 2 |
| 58 | 60 BMA/ 40 SWM 1/1 nDDM | 2 |
| 59 | 60 BMA/ 40 SWM 1/2 nDDM | 2 |

*Comparative Example
SWM = synthetic wax monomer
H = heptane substituted for toluene, reaction run at 90° C.

Adhesive Testing

An ASTM Tape Test was used to determine adhesion (D 3359–90). The substrates were thermoplastic polyolefin (TPO): Dexter D/S 756–67 and polypropylene (PP): Himont SB 823. Plaques were wiped gently with isopropanol. Sample were drawndown using a wire-wound rod, then heated at 50° C. for 30 minutes. The samples were dried in a constant temperature room for 1 week prior to testing for adhesion. The results are shown in Table 1.

TABLE 1

| Sample | TPO | PP |
|---|---|---|
| 47 | 5 | 4.5 |
| 5* | 0 | 1 |
| 6 | 2 | 2 |

*comparative example
5 = great adhesion,
0 = no adhesion

The data above shows the polymers of the invention are useful as adhesives, even on substrates where good adhesion is normally difficult to obtain.

Water Repellents for Nonwovens and Textiles

Polymer compositions of this invention were used as binders in formulations for treating fabric. The polymers were added to the formulations at 10% by weight. The formulations were padded on a Birch Brothers padder at a pressure of 0.17 MPa and a speed of 8 meters per minute. The binder add-on was 6% by weight. The samples were dried in a Mathis oven at 150° C. for 4 minutes.

The dried samples were evaluated using AATCC Test Method 22-1980 Water Repellency Spray Test. The results are shown in Table 2.

TABLE 2

| Sample | Rating |
|---|---|
| Control (No Formulation Padded) | 0 |
| 48 | 80 |
| 11 | 70 |

The data above indicate that the polymers of this invention are useful as water repellents in nonwoven and textile applications.

Wax Replacement in Floor Polish Testing

The following floor polish formulation was used to test the polymer composition of the invention. The acrylic binder/alkaline swellable resin/wax ratio in this formulation is 75/10/15. Equal weight of the polymer composition of the invention was substituted for commercial waxes Epolene®E-43N and Poly Emulsion®325N35. For the no wax control sample, the Rhoplex 1421 level was increased on an equal weight basis to account for the removal of Epolene®043N and Poly Emulsion®325N35.

| Material In Order Of Addition | Percent by Weight |
|---|---|
| Water | 30.73 |
| Kathon ® CG/ICP | 0.03 |
| Acrysol ® 644 (42%) | 5.52 |
| Fluorad ® FC-129 (50%) | 0.02 |
| Diethylene Glycol Ethyl Ether | 5.78 |
| Tripropylene Glycol Methyl ether | 1.02 |
| Rhoplex ® 1421 (38%) | 45.76 |
| Epolene ® E-43N (40%) | 4.35 |
| Poly Emulsion 324N35(35%) | 4.97 |
| SE-21 | 0.02 |

The floor polish was coated on black vinyl (B.V.) for the lab gloss test and on black vinyl composition tile (B.V.C.) for lab black heel mark and scuff tests. The floor test was done on commercial vinyl floor tiles.

Black Heel Mark and Scuff Resistance Test: The lab test is described in Chemical Specialty Manufacturers Association Bulletin No. 9-73 with rubber shoe heels substituted in place of rubber cubes. The Rating scale was 1–10 with 10 being best performance. The floor test was evaluated on marks made by pedestrian traffic in commercial buildings.

Static Coefficient of Friction (S.C.O.F.): The S.C.O.F. was determined by the James Friction Testing Machine based on an average of four readings.

Gloss: Gloss was determined by the ASTM D1455 method.

The results of the tests described above are shown in Tables 3 and 4.

TABLE 3

| Sample | Particle Size | Gloss | Black Mark | Scuff | S.C.O.F. |
|---|---|---|---|---|---|
| 4 | 257 | 10/41 | 6 | 4, light | 0.83 |
| PE Wax* | 150 | 16/49 | 8 | 7 | 0.54 |
| No Wax* | NA | 18/52 | 6 | 5 | 0.90 |

PE Wax/No Wax = comparative examples
NA = not analyzed

TABLE 4

| Sample | P.S. | B.V. | B.V.C. | Black Mark | Scuff | S.C.O.F. |
|---|---|---|---|---|---|---|
| 12 | 240 | 69/89 | 19/49 | 5 | 6 | 0.78 |
| 11 | 375 | 39/73 | 11/41 | 8, light | 7 | 0.72 |
| 9 | 326 | 18/42 | 7/29 | 5 | 9 | 0.77 |
| 10 | 351 | 16/44 | 7/30 | 5, light | 6 | 0.74 |
| 8 | 418 | 9/31 | 3/17 | 6 | 9 | 0.74 |
| PE* | 150 | 76/90 | 19/49 | 9 | 8 | 0.64 |

P.S. = particle size (nm)
B.V. = black vinyl gloss 200/600
B.V.C. = black vinyl composition gloss 200/600
*comparative example Samples 4, 11 and 12 were further tested in a high traffic hallway which was burnished with an UHS Tan Buffer Pad on a 2000 rpm propane floor burnishing machine periodically. The results are shown in Tables 5 and 6.

TABLE 5

| Sample | I. G. | Burn. | 1 week | 2 weeks | 3 weeks | Scuff | B. M. |
|---|---|---|---|---|---|---|---|
| 4 | 21/65 | 64 | 26/46 | 47/73 | 54/55 | 8 | 9 |
| PE* | 30/69 | 91 | 23/34 | 27/68 | 42/51 | 9 | 8 |

I. G. = initial gloss 20°/60°
Burn. = burnished gloss 20°/60°
1 week = 20° gloss as is/burnished
B. M. = black mark
2 weeks = 20°/60° gloss burnished
3 weeks = 20° gloss burnished 1 pass/4 passes

TABLE 6

| Sample | I. G. | Burn. | 1 week | 1 week* | 2 weeks | 2 week* | Scuff |
|---|---|---|---|---|---|---|---|
| 12 | 8 | 87 | 53 | 6 | 9 | 10 | 8/7 |
| 11 | 5(hazy) | 64 | 26 | 7 | 9 | 16 | 8/7 |
| PE* | 9 | 91 | 54 | 8 | 9 | 12 | 9/8 |

I. G. = initial gloss 20°/60°
Burn. = burnished gloss 20°/60°
1 week = 20°/60° gloss
1 week* = 20°/60° gloss burnished after 1 week
2 weeks = 20°/60° gloss after 2 weeks
2 week* = 20°/60° gloss burnished after 2 weeks
Scuff = scuff after 1 week/2 weeks The data above demonstrates that the compositions of this invention responded well to floor burnishing due to their crystallinity.

Dry Powder Coatings

The polymer compostions of this invention were tested for usefulness as dry powder coating compositions. The polymers were ground using a ScienceWare Micro Mill™ grinder. One gram of each dry polymer powder was placed in an aluminum weighing pan. The rest of the dry polymer powder was stored in a jar at room temperature. The room temperature samples were checked to see if they remained free flowing powders after 24 hours storage. The samples in the weighing pans were placed in ovens at 120° C., 140° C,. and 150° C. to determine at what temperature and time would the dry polymer powder form a film. For dry polymer powder coatings, a film forming temperature in the range of 120° C. to 150° C. is acceptable, but the time to form a film is preferably less than 3 hours. The powder stability and time to form a film results are shown in Table 7.

TABLE 7

| Sample | Powder Stability | 120° C. | 140° C. | 150° C. |
|---|---|---|---|---|
| 21* | S | >3 hours | 2.5 hours | NT |
| 22* | Good | >3 hours | 2.5 hours | NT |
| 23* | Good | >3 hours | >3 hours | 2.5 hours |
| 24* | Good | >3 hours | >3 hours | 2.5 hours |
| 25 | Good | >3 hours | >3 hours | 2.5 hours |
| 26 | Good | >3 hours | >3 hours | 2.5 hours |
| 27 | Good | >3 hours | >3 hours | >3 hours |
| 28 | S | <0.5 hours | NT | NT |
| 29 | Good | 1 hour | NT | NT |
| 30 | Good | 1.5 hours | NT | NT |
| 31 | Good | >3 hours | 1.25 hours | NT |
| 32 | Good | >3 hours | >3 hours | 2.5 hours |
| 33 | Good | 0.75 hours | NT | NT |
| 34 | Good | 0.75 hours | NT | NT |
| 35 | Good | 0.75 hours | NT | NT |
| 36 | Good | 1.75 hours | NT | NT |
| 37 | Good | 1.75 hours | NT | NT |
| 38 | Good | <0.5 hours | NT | NT |
| 39 | Good | <0.5 hours | NT | NT |
| 40 | Good | <0.5 hours | NT | NT |
| 41 | Good | <0.5 hours | NT | NT |
| 42 | Good | <0.5 hours | NT | NT |
| 43 | T | NT | NT | NT |
| 44 | T | NT | NT | NT |
| 45 | T | NT | NT | NT |
| 55 | G | NT | NT | <0.5 hours |
| 56 | S | NT | NT | <0.5 hours |
| 57 | G | NT | NT | <0.5 hours |
| 58 | G | NT | NT | <0.5 hours |
| 59 | G | NT | NT | <0.5 hours |

Good = free flowing powder after 24 hours storage
S = slightly tacky, not as free flowing as Good
T = tacky, did not form a dry polymer powder
NT = not tested
*comparative example The data above indicates that the polymers of this invention are useful as dry powder coating compositions.

Some of the properties of the polymers of this invention were compared to polymers with greater than 50 percent by weight synthetic wax monomer incorporation. The data are shown in Table 8.

TABLE 8

| | Sample/Rating | | | | |
|---|---|---|---|---|---|
| SWM/BA | $C_{20}$ | $C_{25}$ | $C_{35}$ | $C_{40}$ | $C_{50}$ |
| 60/40 | 49/P | 41/P | 40/P | 39/P | 38/P |
| 40/60 | 50/T | 43/S | 42/P | 57/P* | NT |
| 20/80 | 51/T | 45/T | 44/S | 55/P* | NT |
| 10/90 | 52/T | 53/T | 54/T | NT | NT |

SWM/BA = weight ratio of synthetic wax monomer to butyl acrylate
P = stable powder, no tack, film formation at 120° C.
*film formation tested at 150° C.
T = tacky, can not make powder
S = slightly tacky, hard to make powder
NT = not tested The data above demonstrates that polymers with greater than 50 percent by weight synthetic wax monomer incorporation form dry powders and are non-tacky regardless of the length of the carbon chain on the synthetic wax monomer. The synthetic wax monomer is significantly more expensive than butyl acrylate and other monomers incorporated in the polymers of this invention. Therefore, it is desirable to reduce the amount of synthetic wax monomer below 60 percent by weight without sacrificing the dry powder polymer properties. The data above shows that the dry powder polymer properties at 60 percent synthetic wax monomer incorporation may be retained at 40 percent incorporation by increasing the length of the carbon chain on the synthetic wax monomer. The data suggests that it may be possible to reduce the percent incorporation of synthetic wax monomer to between 10 and 20 percent by weight without sacrificing dry powder polymer properties.

Hot Melt Sealant

The polymer compositions of this invention were tested as hot melt sealants by applying the solid polymers to glass and vinyl substrates. The samples were heated in an oven to 80° C., 90° C., and 115° C. The heated polymers were checked to see how well they melted at each temperature. A nylon screen was applied over each melted polymer. The polymer was cooled and tested for adhesion with an Instron machine pulling the screen away from the polymer coated substrate. The results shown in Table 9.

TABLE 9

| | Melt Behavior | | | Adhesion (kg/m) | |
|---|---|---|---|---|---|
| Sample | 80° C. | 90° C. | 115° C. | Glass | Vinyl |
| 13* | Poor | Poor | Poor | NT | NT |
| 14 | Poor | Poor | Partial | 214–321 C | A |
| 15 | Partial | Good | Good | 5 A | C |
| 16 | Partial | Partial | Good | 18–36 A | A |
| 17 | Partial | Good | Good | 125–143 C | C |
| 18 | Poor | Partial | Good | 179–250 C | A/C |
| 19 | Partial | Partial | Good | NT | C |
| 20 | Good | Good | Good | 71 A | A |

NT = not tested
A = adhesive failure
C = cohesive failure
*comparative example

The data above indicate that the polymers of this invention are useful as hot melt sealants.

Wood Treatment

The polymer compositions of this invention were applied to wood boards and tested for utility as water repellents for wood applications. Matched sapwood boards measuring 1.8 cm×1.8 cm×1.8 cm (tangential×radial×logitudinal) were used for this test. The wood was straight grained, flat sawn, clear with 6 to 10 rings per 2.5 cm, and 40% to 50% summerwood. Samples were cut with a fine tooth saw to obtain as smooth a surface as possible. The polymer compositions and control wood treatment compositions were applied to the wood boards by pressure treatment. For each level (weight percent) of coating composition tested, two wood boards were coated with the polymer of this invention. The coated wood was dried for two weeks.

Samples were conditioned for 10 days at 45% relative humidity. The sample weights were checked until constant to insure moisture equilibrium. Samples were weighed to the nearest 0.001 grams. Samples were tested using a Dynamic Swellometer apparatus that records swell in thousands of an inch. The instrument automatically measures Swell Values during the test. Samples were measured (radial, tangential, longitudinal dimensions) using a micrometer and the measurements were recorded. Samples were placed radially in a swell chamber and secured so that no floating could occur during testing. Samples were then covered with distilled water and tested for 100 minutes. Immediately after testing, the samples were removed and weighed to the nearest 0.001 gram. Samples were again measured (radial, tangential, longitudinal dimensions) using a micrometer and the measurements were recorded.

Water Repellency Efficiency ("WRE") was measured following the following formula:

$$\% \text{ WRE} = \frac{A-B}{A} \times 100$$

The first wood board was sampled 4 times. The second wood board was sampled 2 times. The results of the tests were averaged. The results are shown in Table 10.

TABLE 10

| Coating | Level (Weight %) | Average % WRE | |
|---|---|---|---|
| | | 10 Minutes | 60 Minutes |
| Wax* | 0.6 | 87 | 51 |
| CCA/Wax* | 0.6/0.6 | 83 | 53 |
| 4 | 1 | 72 | 41 |
| | 2.5 | 91 | 59 |
| | 5 | 82 | 44 |
| 7 | 1 | −32 $ | −37 $ |
| | 2.5 | 77 | 35 |
| | 5 | 93 | 70 |

*comparative example
CCA = copper chrome arsenate
$ = experimental error suspected The data above shows that the polymers of this invention provide good water resistance and are suitable for wood treatment applications.

We claim:

1. A method of preparing a polymer comprising:

1) forming a slurry by cooling a solution containing a synthetic wax monomer of formula I:

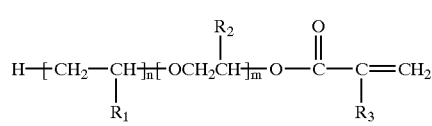

wherein

R1 is selected from H and CH3,

R2 is selected from H and C1–C5 alkyl,

R3 is selected from H and CH3, n=9–115, and m=0–1370;

wherein the synthetic wax monomer of formula I is less soluble in organic solvents than other synthetic wax monomers;

and a solvent;

2) forming a reaction mixture by admixing at least one second monomer with the slurry; and 3) polymerizing the reaction mixture in the presence of an initiator.

2. The method of claim 1 wherein the polymer comprises as polymerized units, from 1 to less than 50 percent by weight of the synthetic wax monomer and from 50 to 99 percent by weight of the at least one second monomer.

3. The method of claim 1 wherein the polymer comprises as polymerized units, from 3 to 45 percent by weight of the synthetic wax monomer and from 55 to 97 percent by weight of the at least one second monomer.

4. The method of claim 1 wherein the synthetic wax monomer of formula I has n=12–90.

5. The method of claim 1 wherein the synthetic wax monomer of formula I has n=15–50.

6. The method of claim 1 wherein the solvent is selected from the group consisting of hexane, heptane, xylene, toluene, ethyl acetate, butyl acetate, hexanol, heptanol, octanol, decane, and decalin.

* * * * *